(No Model.)

E. L. GREGG.
TOE WEIGHT.

No. 418,945. Patented Jan. 7, 1890.

WITNESSES:
Fred G. Dieterich
P. B. Turpin

INVENTOR:
Elwood L. Gregg.
BY Munn
ATTORNEYS

UNITED STATES PATENT OFFICE.

ELWOOD L. GREGG, OF HOXIE, KANSAS.

TOE-WEIGHT.

SPECIFICATION forming part of Letters Patent No. 418,945, dated January 7, 1890.

Application filed October 11, 1889. Serial No. 326,743. (No model.)

*To all whom it may concern:*

Be it known that I, ELWOOD L. GREGG, of Hoxie, in the county of Sheridan and State of Kansas, have invented a new and useful Improvement in Toe-Weights, of which the following is a specification.

My invention is an improvement in toe-weights for horseshoes, and has for an object to provide a novel simple construction of weight and fastening devices which will enable the weight to be securely held to the shoe and conveniently applied to and removed therefrom.

The invention consists in certain novel constructions and combinations of parts, as will be hereinafter described and claimed.

Figure 1:
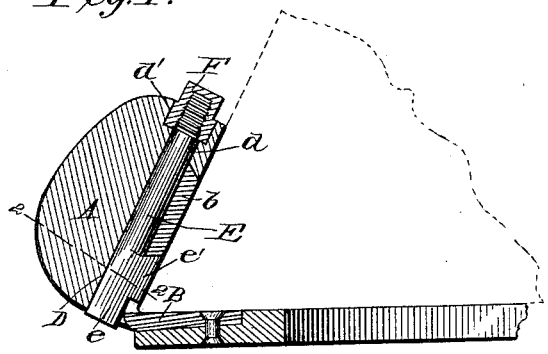
Figure 2:
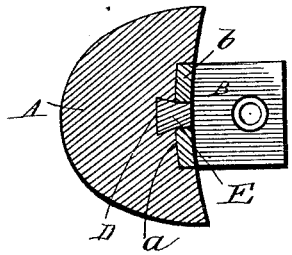
Figure 3:
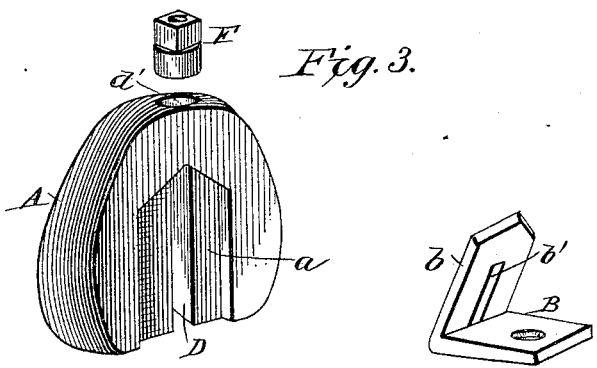
Figure 3:
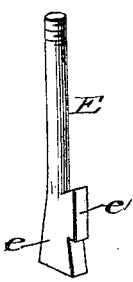

In the drawings, Figure 1 is a vertical section of my invention as in use. Fig. 2 is a cross-section on about line 2 2 of Fig. 1. Fig. 3 represents the parts in detail.

The toe-weight A is provided in its rear side with a recess $a$, the upper wall of which is preferably formed with inclined wings, which are undercut or dovetailed, as shown, the said recess being arranged to open at its lower edge and being so formed as to size and shape as to receive the upright wing $b$ of the clip B. Such clip B is usually riveted by its horizontal wing to the toe of the shoe; but manifestly it would involve no departure from the broad principles of my invention to make the clip and shoe integral. The upper edge of wing $b$ is formed to fit the undercut top wall of the recess $a$, so that when the wing $b$ is in said recess the weight will be locked to the wing against movement, except longitudinally off the same. In the said wing $b$ is provided an opening $b'$, the upper wall of which is undercut, and which receives a projection on the fastening-bolt presently described.

In the base-wall of recess $a$, I form a groove D, the walls of which are undercut or dovetailed, and through the top of the weight, in line with said groove D, I form an opening $d$, the upper end of which is enlarged, forming a recess $d'$ for the nut. The fastening-bolt E is formed at its lower end with a dovetail portion $e$ to fit the groove D, is provided with a rearwardly-extended lug or projection $e'$ to enter the opening $b'$ of wing $b$, and has a rounded portion to fit the opening $d$, the upper end of which portion is threaded to receive the nut F, which fits partially in the recess $d'$. Such construction is simple, easily made, and possesses no parts likely to get out of order or broken.

In operation, the clip being in place on the shoe, and it being desired to apply the weight, the bolt is adjusted with its projection in the opening of the clip, and the weight is then moved down on both the bolt and clip until the bolt extends up through said weight, and the clip-wing $b$ fits in the rear cavity or recess of the weight. The nut F may now be applied to secure such parts in such arrangement, when the weight will be firmly held and yet may be quickly removed by reversing the operation just described. It will be noticed that the upper end of the lug or projection $e'$ of the bolt E is beveled to fit the undercut top wall of the opening $b'$.

Having thus described my invention, what I claim as new is—

1. In a toe-weight, the combination of the clip, the weight having a dovetail or undercut groove, and the fastening-bolt formed to fit said groove and provided on its rear side with a projection arranged to engage the clip, all substantially as and for the purposes set forth.

2. In a toe-weight, the combination of the weight having in its rear side a recess formed to receive the upright wing of the clip, provided in the base of such recess with an undercut groove, and having an opening formed in line with said groove, the clip having its upright arm formed with an opening, and the fastening-bolt having a dovetail portion to fit the groove of the weight and provided with a projection to enter the opening of the clip, substantially as set forth.

ELWOOD L. GREGG.

Witnesses:
I. A. WINTERNITZ,
I. W. PATTERSON.